United States Patent [19]
Penn

[11] Patent Number: 4,617,667
[45] Date of Patent: Oct. 14, 1986

[54] GAS LASER TUBE ASSEMBLY
[75] Inventor: Wayne M. Penn, Cartersville, Ga.
[73] Assignee: P.R.C., Ltd., Landing, N.J.
[21] Appl. No.: 546,741
[22] Filed: Oct. 28, 1983
[51] Int. Cl.⁴ .............................................. H01S 3/02
[52] U.S. Cl. ...................................... 372/35; 372/61; 372/88; 372/109
[58] Field of Search ............... 372/61, 35, 87, 88, 372/107, 109, 34

[56] References Cited
U.S. PATENT DOCUMENTS

| | | | |
|---|---|---|---|
| 3,361,989 | 1/1968 | Sirons | 331/94.5 |
| 3,482,183 | 12/1969 | Thorburn | 331/94.5 |
| 3,500,239 | 3/1970 | Frappard et al. | 331/94.5 |
| 3,510,801 | 5/1970 | Mastrup | 372/35 |
| 3,518,569 | 6/1970 | Otto et al. | 331/94.5 |
| 3,586,996 | 6/1971 | Milochevitch et al. | 331/94.5 |
| 3,652,954 | 3/1972 | Snitzer | 331/94.5 |
| 3,665,337 | 5/1972 | Koechner | 331/94.5 |
| 3,735,282 | 5/1973 | Gans | 331/94.5 |
| 3,891,945 | 6/1975 | Schlossberg et al. | 372/35 |
| 4,150,341 | 4/1979 | Ferguson | 331/94.5 C |
| 4,207,541 | 6/1980 | Karger et al. | 331/94.5 P |

FOREIGN PATENT DOCUMENTS 2740606 4/1979 Fed. Rep. of Germany .

Primary Examiner—James W. Davie
Attorney, Agent, or Firm—Antonelli, Terry & Wands

[57] ABSTRACT

A gas laser tube assembly is disclosed wherein an elongated gas laser plasma tube is connected by a releasable connection to a member having a gas port positioned adjacent one end of the elongated gas laser plasma tube in spaced relationship thereto along the longitudinal axis of the plasma tube. The releasable connection and the member are arranged for telescoping movement with respect to another in either direction along the longitudinal axis of the plasma tube at least upon release of the connection thereby facilitating removal and installation of the plasma tube from the assembly. The releasable connection includes a first part connected to one end of the plasma tube and a second part releasably connected to the member with the first and second parts being releasably connected to one another. A cooling jacket surrounding the plasma tube is connected at one of its ends to the first part and an electrode is mounted on the second part and extends within the one end of the plasma tube whereby the electrode can be removed from the assembly for cleaning, repair or replacement without disturbing the integrity of the coolant passage defined between the cooling jacket and the plasma tube. Gas is conveyed to or from the plasma tube by way of the gas port in the member and cooperating gas passages in the releasable connection and the electrode.

31 Claims, 6 Drawing Figures

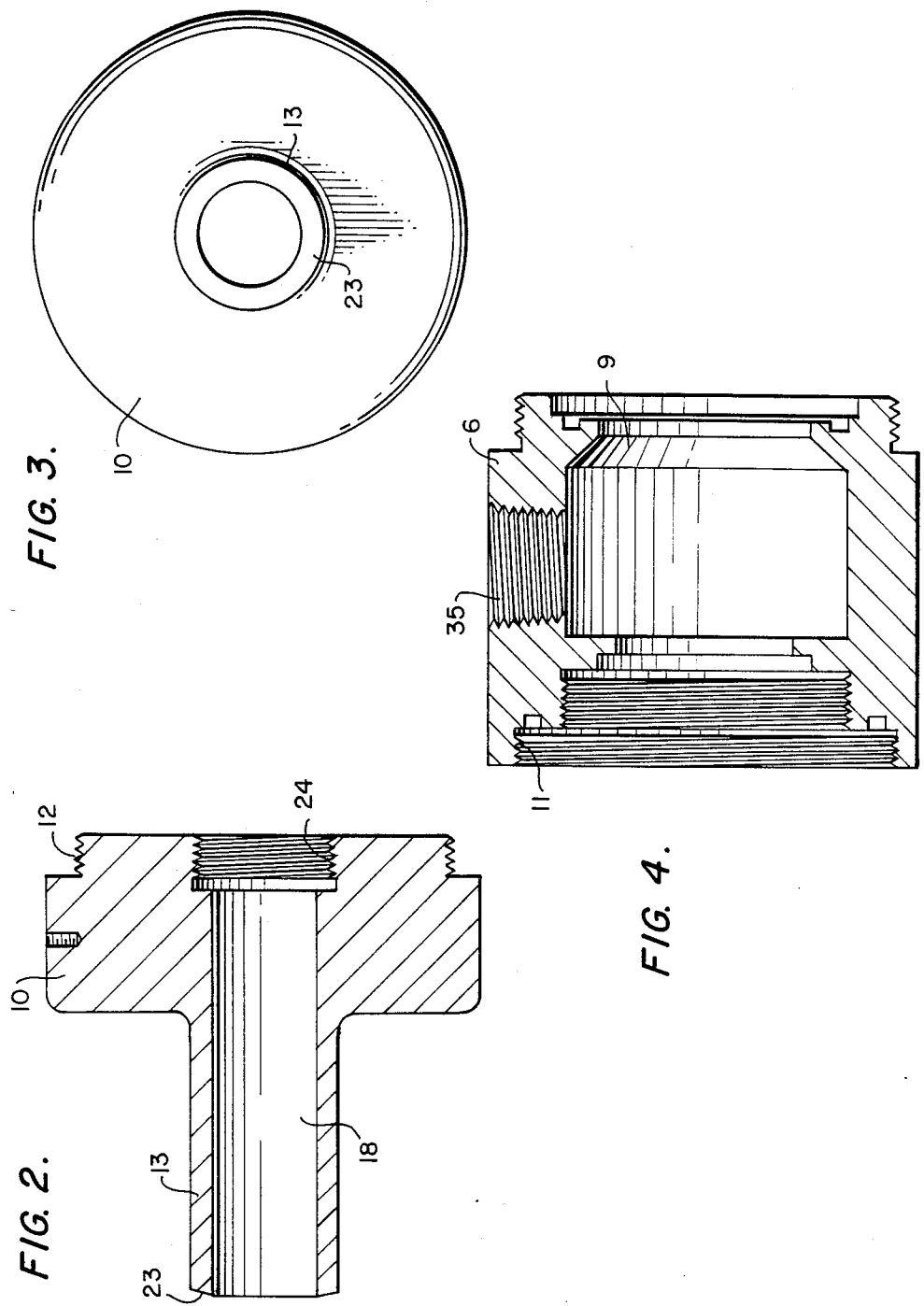

GAS LASER TUBE ASSEMBLY

BACKGROUND AND SUMMARY OF THE INVENTION

The present invention relates to an improved gas laser tube assembly for a $CO_2$, CO, or other gas laser.

In the past the conventional way of making a gas laser tube has been to glass blow the tube including the various seals or fittings thereof. However, this type of glass blown tube is problematical because it is subject to breakage at the hose fittings, vacuum fittings, etc. during shipping and assembly, and also because of the difficulty in removing and cleaning electrodes used with the tube.

In an attempt to avoid the aforementioned problems associated with glass blown tubes, it has been proposed to employ non-blown glass tubes in the form of straight pieces of glass pipe with special fittings in the form of concentric metal sealing rings being provided on the ends of the glass pipes for sealing purposes. However, this known arrangement is disadvantageous in that disassembly thereof requires pulling the laser mirror mount off thereby requiring realignment of the laser mirror when reassembling. Further, such a disassembly operation requires breakage of the coolant oil seal and draining of the coolant oil which can be a messy, time consuming operation wherein it is possible to spill oil into the plasma tube bore.

An object of the present invention is to provide an improved gas laser tube assembly which avoids these problems associated with known laser tube assemblies. More particularly, an object of the invention is to provide a gas laser tube assembly which permits pulling out the laser tube without destroying the laser alignment or changing the alignment of the laser mirrors.

A further object of the invention is to provide a gas laser tube assembly wherein it is unnecessary to break the seal to the liquid coolant as in the prior art arrangements to clean, repair or replace electrodes.

Another object of the invention is to provide a gas laser tube assembly wherein the opposite ends of the plasma tube are subjected to essentially equal cooling and wherein the electrodes at the respective ends are of equal mass thereby allowing either end of the tube to function as a cathode so that the laser tube can be run on either alternating or direct current. While most gas lasers are operated with direct current, alternating current may be desirable in certain low cost applications or where 120 pulses per second are desired. In the past, gas laser tubes have generally not been balanced in mass and cooling at each end.

A still further object of the present invention is to provide a gas laser tube assembly which results in improved optical axis alignment between the plasma tube and the adjacent end structure of the assembly.

These and other objects of the invention are attained by providing a gas laser tube assembly comprising an elongated gas laser plasma tube, a member positioned adjacent one end of the elongated gas laser plasma tube in spaced relationship thereto along the longitudinal axis of the plasma tube, and releasable connection means extending between and releasably connecting the one end of the plasma tube and the member in spaced relationship along the longitudinal axis of the plasma tube, the connection means and the member being arranged for telescoping movement with respect to one another in either direction along the longitudinal axis of the plasma tube at least upon release of the connection means thereby facilitating removal and installation of the plasma tube from the assembly.

In a disclosed, preferred embodiment of the invention the member positioned adjacent the end of the elongated gas laser plasma tube includes a bore which serves as a gas port for conveying gas to or from the interior of the plasma tube by way of a cooperating passage provided in the releasable connection means. The bore in the member and the cooperating passage in the releasable connection means extend in a direction essentially coaxial with the longitudinal axis of the plasma tube.

The bore in the member extends completely through the member and the end of the member opposite the plasma tube includes means for connecting a mirror or an additional gas laser plasma tube to the member. With this arrangement, upon release of the releasable connection means, the plasma tube can be removed and reinstalled in the assembly without destroying the laser alignment or requiring realignment of the laser mirror when reassembling.

According to a further feature of the disclosed embodiment, the releasable connection means includes a first part connected to the one end of the plasma tube and a second part releasably connected to the member with means being provided for releasably connecting the first and second parts to one another. The first part includes an electrode attached therewith, the electrode having a bore extending therethrough in a direction essentially coaxial with the longitudinal axis of the plasma tube. The one end of the plasma tube is bell-shaped to accommodate at least a portion of the electrode therein.

The gas laser tube assembly of the disclosed embodiment further includes a cooling jacket surrounding the plasma tube in spaced relationship thereto so as to define a coolant passage between the cooling jacket and the plasma tube. Means are provided for connecting one end of the cooling jacket to the first part. More specifically, the outer surface of the one end of the cooling jacket is conically shaped and the means for connecting the one end of the cooling jacket to the first part includes a conical cooling jacket sealing ring surrounding the conically shaped one end of the cooling jacket and threadedly attached to the first part, a compression ring positioned between the sealing ring and the outer surface of the conically shaped one end of the cooling jacket and an O-ring seal positioned between the first part and an end surface of the one end of the cooling jacket. The first part includes a passage for conveying a fluid coolant to or from the coolant passage. By connecting the cooling jacket and the electrode to the first and second parts, respectively, of the releasable connection means, it is possible to remove the electrode from the assembly for cleaning, repair or replacement or to clean the interior of the plasma tube without distrubing the integrity of the coolant passage. Because of this and the fact that the plasma tube can be readily removed and reinstalled in the assembly without destroying the laser alignment, it is possible to remove the plasma tube from the assembly and service the electrode and the interior of the plasma tube in a very short time without risk of oil contamination in the plasma tube bore.

The connection between the first part and the one end of the plasma tube is a releasable connection made by means of a plasma tube sealing ring which is threadedly attached to the first part with an O-ring seal being positioned between the sealing ring and the first part and engaging the outer surface of the one end of the plasma tube.

It is another feature of the invention that an assembly of the type described is provided at each end of the elongated gas laser plasma tube thereby facilitating removal and reassembly of the plasma tube for servicing the electrodes or cleaning the interior of the plasma tube without disrupting the intergrity of the coolant passage between the plasma tube and the outer cooling jacket and without requiring realignment of the laser. Also, with the uniform cooling provided by this overall arrangement and with the use of electrodes at each end having equal mass, the laser can be run on either alternating or direct current since it is balanced in mass and cooling at each end.

A still further feature of the illustrated embodiment is that the second part of the releasable connection means includes a tubular projection at its end opposite the plasma tube. The tubular projection surrounds and is essentially coaxial with the bore in the second part and is telescopically positioned within the bore or gas port of the adjacent member. The releasable connection means includes means for releasably sealing the tubular projection in a gas-tight manner in the bore of the adjacent member. This means includes a tubular projection sealing ring threadedly attached to the adjacent member and an O-ring seal positioned between the adjacent member and the sealing ring and engaging the outer surface of the tubular projection. When sealing pressure upon the outer surface of the tubular projection is released, the connection means and the adjacent member can be telescopically moved with respect to one another in either direction along the longitudinal axis of the plasma tube to facilitate removal and installation of the plasma tube from the assembly.

Where this type of arrangement is provided at each end of the plasma tube, upon release of the connection means the plasma tube can be moved laterally along the longitudinal axis of the plasma tube toward one adjacent member at a first end and away from an additional adjacent member at its second end so that the tubular projection at the second end moves out of the cooperating bore of the additional member. Thereafter, the second end of the plasma tube can be swung out of alignment with the gas port of the additional member. The plasma tube is then moved in the opposite direction to completely remove the plasma tube from the member adjacent its first end. Reinstallation of the plasma tube is accomplished in a similar fashion by reversing this sequence. The invention thus permits disassembly and reassembly without destroying the alignment of the mirrors or adjacent plasma tubes connected with the member and additional member.

According to another feature of the invention the leading end of the tubular projection received in the gas port is inclined with respect to the longitudinal or optic axis of the plasma tube. This conditions the gas flow through the plasma tube and cuts down on internal stray radiation.

These and other objects, features and advantages of the present invention will become more apparent from the following description when taken in connection with the accompanying drawings which show, for purposes of illustration only, one preferred embodiment in accordance with the invention.

BRIEF DESCRIPTION OF THE DRAWINGS

FIG. 2 is a cross-sectional view of the gas port plug and electrode mount component of the assembly of FIG. 1 taken along its longitudinal axis;

FIG. 3 is an end view of the gas port plug and electrode mount component of the assembly of FIG. 2 taken from the left side of FIG. 2 in the direction the longitudinal axis of the component;

FIG. 4 is a cross-sectional view of the master sealing ring of the assembly of FIG. 1 taken along the longitudinal axis of the ring;

DETAILED DESCRIPTION OF THE DISCLOSED EMBODIMENT

Figure 1:
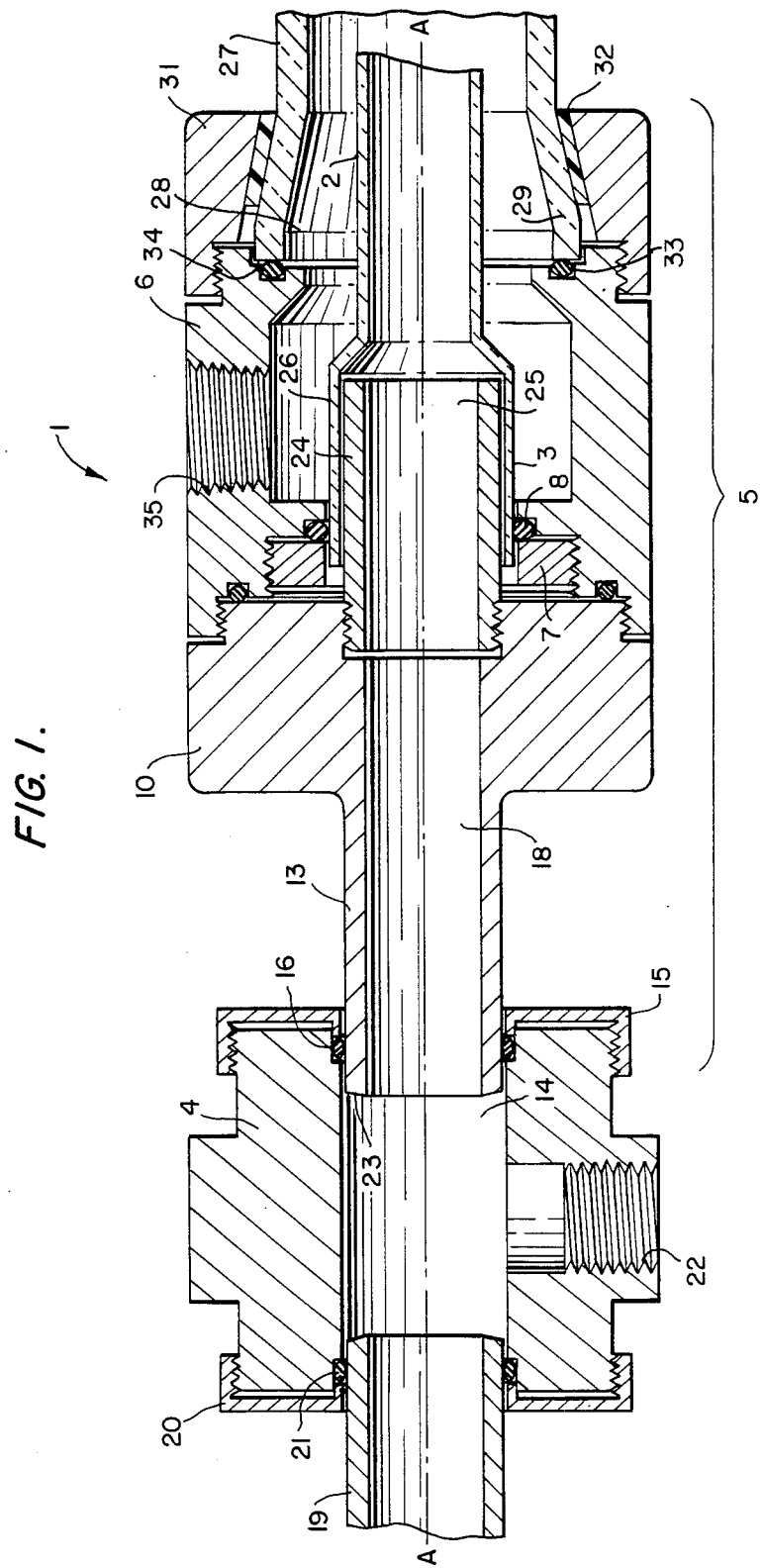
FIG. 1 is a cross-sectional view of a gas laser tube assembly according to a preferred embodiment of the invention taken along the longitudinal axis A—A of the plasma tube of the laser.

Referring now to the drawings, a gas laser tube assembly 1 according to the invention for a $CO_2$, CO or other gas laser is illustrated in FIG. 1. The assembly is formed of an elongated gas laser plasma tube 2, only the left end 3 of which is shown in the drawing, a fitting member 4 positioned adjacent the end 3 of the plasma tube 2 in spaced relationship thereto along the longitudinal axis A—A of the plasma tube, and a releasable connection means 5 extending between and releasably connecting the end 3 of the plasma tube 2 and the member 4 in spaced relationship along the longitudinal axis A—A of the plasma tube.

The releasable connection means 5 and the member 4 are arranged for telescoping movement with respect to one another in either direction along the longitudinal axis of the plasma tube at least upon release of the connection means thereby facilitating removal and installation of the plasma tube from the assembly. More particularly, as shown in FIG. 1, the releasable connection means 5 includes a first part 6 in the form of a master sealing ring connected to the end 3 of the plasma tube 2 by means of a plasma tube sealing ring 7 threadedly attached to the first part and an O-ring seal 8 positioned between the sealing ring and the first part and engaging the outer surface of the end 3 of the plasma tube 2. When the O-ring seal is compressed by the sealing ring 7 it sealingly engages the outer surface of the end 3 of the plasma tube 2 and supports the end 3 of the plasma tube within the central bore 9 of the first part 6.

The releasable connection means 5 further includes a second part 10 formed as a gas port plug and electrode mount which is releasably connected to the first part 6 by means of cooperating screw threads 11 and 12 provided on the respective parts as illustrated in FIGS. 1, 2 and 4. The second part 10 includes a tubular projection 13 at its end opposite the plasma tube 2. The tubular projection 13 is telescopically positioned within a bore 14 of the member 4. The tubular projection 13 is releasably connected within the bore 14 of the member 4 by means of a tubular projection sealing ring 15 and an O-ring seal 16 of the releasable connection means 5. The sealing ring 15 is threadedly attached to the member 4 and the O-ring seal 16 is positioned between the member 4 and the sealing ring 15 and engages the outer surface of the tubular projection 13 in a gas-tight manner when compressed by the sealing ring. Because of the overall length of the tubular projection 13 and also the fact that the bore 14 of the member 4 extends completely through the member, upon release of the compressive pressure on the O-ring seal 16 by the sealing ring 15, the connection means 5 and the member 4 may be telescopically moved with respect to one another in either direction along the longitudinal axis A—A of the plasma tube 2 thereby facilitating removal and installation of the plasma tube from the assembly.

Figures 5, 6:
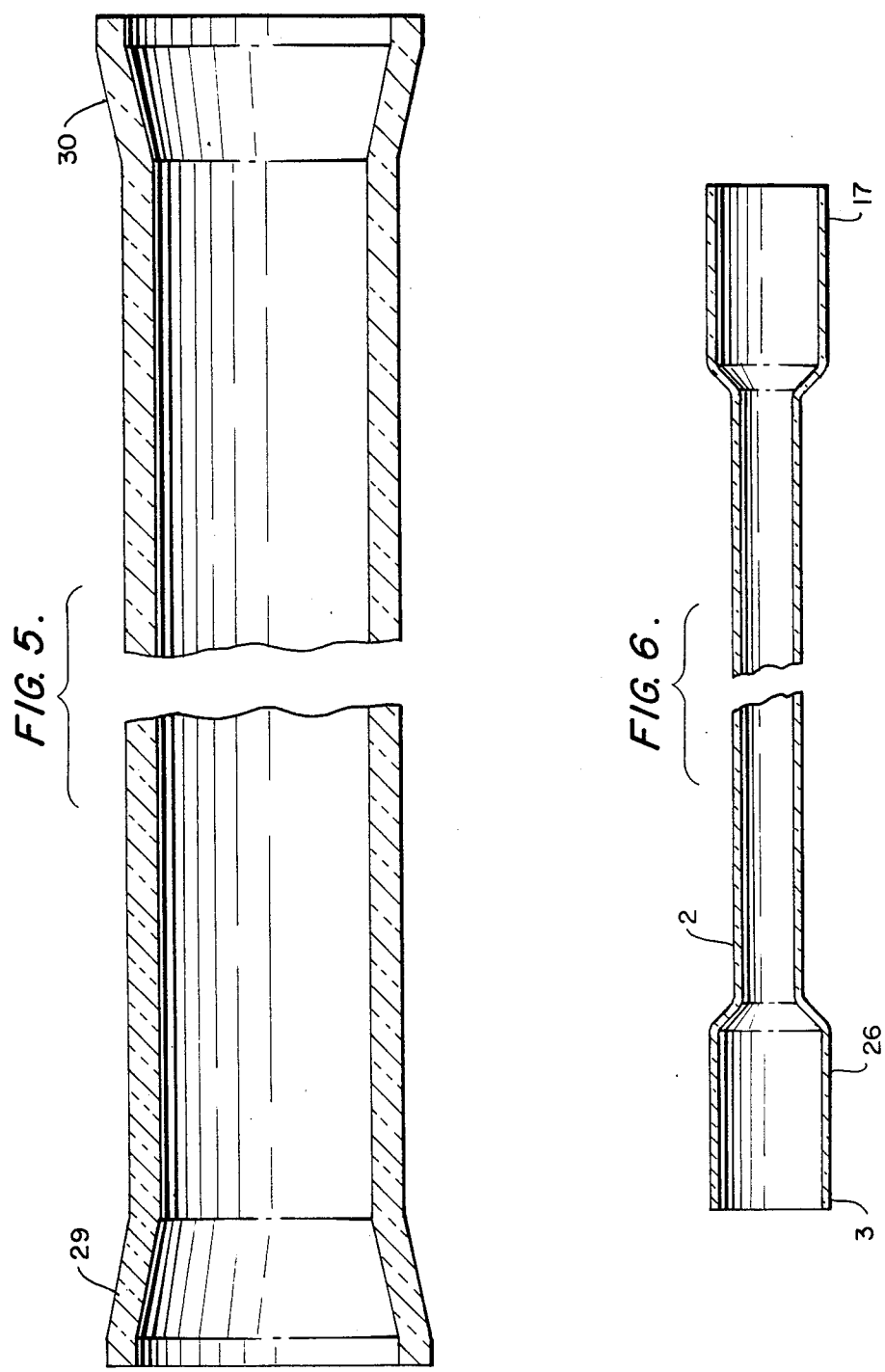
FIG. 5 is a cross-sectional view of the cooling jacket of the assembly of FIG. 1 taken along the longitudinal axis of the cooling jacket.
FIG. 6 is a cross-sectional view of the plasma tube of the laser gas tube assembly of FIG. 1 taken along the longitudinal axis A—A of the plasma tube.

While an assembly is shown at only the left end 3 of the plasma tube 2 in FIG. 1, according to the invention the right end 17 (see FIG. 6) of the plasma tube 2 may also be provided with a like assembly (not shown). In such an arrangement the members 4 at each end of the plasma tube 2 are spaced such that, at least after release of the compressive pressure of the tubular projection sealing rings on the respective O-ring seals engaging the tubular projections, the subassembly of the plasma tube 2 with first and second parts 6 and 10 at the left end thereof and corresponding parts at the right end thereof can be moved in either direction along the longitudinal axis of the plasma tube to remove the tubular projection at one end from the bore of its adjacent member so the one end of the subassembly can be swung out of alignment with the bore and member to permit complete withdrawal of the tubular projection at the opposite end of the subassembly from the bore of its adjacent member. This can be done without changing the relative positions of the members 4. Thus, the gas laser tube assembly of the invention permits pulling out the laser tube without destroying the laser alignment and without changing the mirror position as discussed more fully hereinafter.

In the assembly of FIG. 1, the bore 14 of member 4 is in communication with the interior of the plasma tube 2 by way of a cooperating passage 18 provided in the second part 10 of the releasable connection means 5. The bore 14 and the cooperating passage 18 extend in a direction essentially coaxial with the longitudinal axis A—A of the plasma tube 2. The bore 14 extends completely through the member 4 with the end of the member 4 opposite the plasma tube 2 including means for connecting a mirror or an additional gas laser plasma tube 19 to the member 4. The means for connecting includes a sealing ring 20 and an O-ring seal 21 of the type at the end of the member 4 adjacent the plasma tube 2. This arrangement permits a gas such as carbon dioxide to be conducted to or from the interior of the plasma tube 2 by way of a fitting 22 of the member 4 in communication with the bore 14. The leading end 23 of the tubular projection 13 in the bore 14 is inclined with respect to the optic axis of the gas laser tube to condition the gas flow through the tube and cut down on internal stray radiation. Preferably, the leading end 23 is inclined at an angle of between 30 and 45 degrees with respect to the optic axis.

The second part 10 of the releasable connection means 5 is also formed with screw threads 24 at its end adjacent the plasma tube 2 for mounting an electrode 24 thereto. The electrode 24 has a central bore extending therethrough in a direction essentially coaxial with the longitudinal axis of the plasma tube 2. Each end of the plasma tube 2 is bell-shaped as shown at 26 in FIG. 1 to accommodate a coaxial, concentric electrode therein in the manner illustrated.

The gas laser tube assembly 1 further includes a cooling jacket 27 surrounding the plasma tube 2 in spaced relationship thereto so as to define a coolant passage 28 between the cooling jacket and the plasma tube. In addition to coolant containment, the cooling jacket also provides structural support for the assembly because of its relatively thick wall. The cooling jacket has conically shaped ends 29 and 30. As shown in FIG. 1, the left end 29 is connected to the first part 6 of the releasable connection means 5 by means of a conical cooling jacket sealing ring 31 surrounding the conically shaped end 29 and threadedly attached to the first part 6, a plastic compression ring 32 positioned between the sealing ring 31 and the outer surface of the end 29 of the cooling jacket, and an O-ring seal 33 positioned between the first part 6 and an end surface 34 of the cooling jacket. The first part 6 includes a passage 35 for conveying fluid coolant such as a dielectric cooling oil to or from the coolant passage 28.

As a result of this arrangement, once a plasma tube 2 with its cooling jacket 27 and respective first and second parts at opposite ends have been removed from the members adjacent the opposite ends thereof as discussed above, the second part 10 at each end can be simply unscrewed from the first part 6 to clean, repair or replace the electrode 24 or to clean the interior of the plasma tube 2 without breaking the seal to the cooling oil. Thus, the time consuming and messy process of draining the cooling oil is avoided along with the possibility of getting oil in the plasma tube bore. This procedure can be accomplished in a relatively short period, such as two hours, whereas in the past the removal and reassembly operation has required two days because the mirror mount had to be pulled off and the oil seal broken, the oil drained, and the laser realigned during reassembly. In contrast, with the present invention, when the tubular projections of the second parts are reinserted in the gas ports of the adjacent members and the tubular projection sealing rings tightened to compress the O-ring seals against the outer surfaces of the tubular projections, the plasma tube 2 is returned to its aligned position with respect to the adjacent members and the mirrors or other plasma tubes associated therewith.

The use of a like gas laser tube assembly of the invention at each end of the plasma tube 2 also results in balanced mass and cooling at each end of the plasma tube. Therefore, the laser tube can be run on either alternating current or direct current. Alternating current may be desirable in low cost applications or where 120 laser pulses per second are desired.

The plasma tube 2 and the cooling jacket 27 are each formed of a heat resistant glass such as Corning Pyrex glass precision bore tubing. The conically shaped ends 29 and 30 of the cooling jacket 27 are precision straightened under rollers at the glass annealing temperature with the ends of the tube being square to the bore so that the length of the cooling jacket as measured on one side of the tube does not vary more that 0.005 inch as the tube is rotated. In the illustrated embodiment the cooling jacket 27 is 60 inches in length with the bow between ends thereof being less than or equal to 0.020 inch and the out of roundness of the outer diameter of the tube being less than or equal to 0.010 inch. The wall thickness of the cooling jacket is 4.4 mm. The plasma tube 2 in the disclosed embodiment has an overall length of 64 and 1/16 inches and a wall thickness of 1.5 millimeters. The bell-shaped ends of the plasma tube are precision formed by being shrunk on to a mandrel so that excellent alignment of the plasma tube can be attained according to the invention by low skilled labor. The first and second parts 6 and 10 of the releasable connection means 5 and the member 4 are formed of 6061 aluminum alloy with the outer surfaces of the parts being provided with a soft anodized coating. The tubular projection sealing ring 15 and the conical cooling jacket sealing ring 31 are formed of brass. The electrode 24 is a copper electrode although other metals such as nickel may be employed.

Likewise, it will be readily understood by the skilled artisan that other materials and dimensions than those referred to above may be employed in connection with the several components of the invention. Further while I have shown and described only one embodiment in accordance with the invention, it is understood that the same is not limited thereto, but is susceptible to numerous changes and modifications as known to those skilled in the art. Therefore, I do not wish to be limited to the details shown and described herein, but intend to cover all such changes and modifications as are encompassed by the scope of the appended claims.

I claim:

1. A gas laser tube assembly comprising an elongated gas laser plasma tube, a fitting member for connection to the end of said elongated gas laser plasma tube, said fitting member being positioned adjacent one end of said elongated gas laser plasma tube and spaced from said tube end along the longitudinal axis of said plasma tube, and releasable connection means extending between and releasably connected with said one end of said plasma tube and said fitting member spaced along the longitudinal axis from said plasma tube, one of said connection means and said fitting member having a bore and the other having an elongated projection extending a substantial distance along the longitudinal axis of said tube and telescopically arranged within said bore so that said fitting member and said connection means can be moved with respect to one another in either direction along the longitudinal axis of said plasma tube at least upon release of said connection means thereby facilitating removal and installation of said plasma tube from said assembly.

2. A gas laser tube assembly according to claim 1, wherein said fitting member includes said bore which is in communication with the interior of said plasma tube by way of a cooperating passage provided in said releasable connection means.

3. A gas laser tube assembly according to claim 2, wherein said bore in said fitting member and said cooperating passage in said releasable connection means extend in a direction essentially coaxial with the longitudinal axis of said plasma tube.

4. A gas laser tube assembly according to claim 3, wherein said bore extends completely through said fitting member and wherein the end of said fitting member opposite said one end of said plasma tube includes means for connecting a mirror or an additional gas laser plasma tube to said fitting member.

5. A gas laser tube assembly according to claim 2, wherein said bore in said fitting member is a gas port for conveying gas to or from said plasma tube by way of the cooperating passage in said releasable connection means.

6. A gas laser tube assembly according to claim 1, wherein said releasable connection means includes a first part connected to said one end of said plasma tube and a second part releasably connected to said fitting member, and wherein means are provided for releasably connecting said first and second parts to one another.

7. A gas laser tube assembly according to claim 6, wherein said second part includes an electrode attached thereto.

8. A gas laser tube assembly according to claim 7, wherein said electrode has a bore extending therethrough in a direction essentially coaxial with the longitudinal axis of said plasma tube.

9. A gas laser tube assembly according to claim 8, wherein said one end of said plasma tube is bell-shaped, at least a portion of said electrode being accommodated in the bell-shaped end of said plasma tube.

10. A gas laser tube assembly according to claim 6, wherein said assembly further includes a cooling jacket surrounding said plasma tube in spaced relationship thereto so as to define a coolant passage between said cooling jacket and said plasma tube, and wherein means are provided for connecting one end of said cooling jacket to said first part.

11. A gas laser tube assembly according to claim 10, wherein the outer surface of said one end of said cooling jacket is conically shaped and said means for connecting said one end of said cooling jacket to said first part includes a conical cooling jacket sealing ring surrounding said conically shaped one end of said cooling jacket and threadedly attached to said first part, a compression ring positioned between said sealing ring and the outer surface of said conically shaped one end of said cooling jacket, and an O-ring seal positioned between said first part and an end surface of said one end of said cooling jacket.

12. A gas laser tube assembly according to claim 10, wherein said first part includes a passage for conveying fluid coolant to or from said coolant passage.

13. A gas laser tube assembly according to claim 6, wherein means are provided for releasably connecting said first part to said one end of said plasma tube, said means comprising a plasma tube sealing ring threadedly attached to said first part and an O-ring seal positioned between said sealing ring and said first part and engaging the outer surface of said one end of said plasma tube.

14. A gas laser tube assembly according to claim 6, wherein an O-ring seal is provided between said releasably connected first and second parts.

15. A gas laser tube assembly according to claim 1, further comprising an additional fitting member positioned adjacent the other end of said plasma tube and spaced from said other end along the longitudinal axis of said plasma tube, and an additional releasable connection means extending between and releasably connected with said other end of said plasma tube and said additional fitting member spaced along the longitudinal axis from said plasma tube, one of said additional connection means and said additional fitting member having a bore and the other having an elongated projection extending a substantial distance along the longitudinal axis of said tube and telescopically arranged within said bore for telescoping movement with respect to one another in either direction along the longitudinal axis of said plasma tube at least upon release of said additional connection means thereby facilitating installation and removal of said plasma tube from said assembly.

16. A gas laser tube assembly according to claim 1, wherein said releasable connection means and said fitting member are arranged for said telescoping movement by means of a tubular projection provided at the end of said connection means opposite said plasma tube, said tubular projection extending in a direction essentially coaxial with the longitudinal axis of said plasma tube and being telescopingly positioned within said bore which is provided in said fitting member.

17. A gas laser tube assembly according to claim 16, wherein said releasable connection means includes means releasably connecting said tubular projection in the bore of said fitting member.

18. A gas laser tube assembly according to claim 17, wherein said means releasably connecting said tubular projection in the bore of said fitting member includes a tubular projection sealing ring threadedly attached to said fitting member and an O-ring seal positioned between said fitting member and said sealing ring and engaging the outer surface of said tubular projection.

19. A gas laser tube assembly comprising an elongated gas laser plasma tube, a first part in the form of a sealing ring connected to one end of said plasma tube, a cooling jacket surrounding said plasma tube so as to define a coolant passage between said cooling jacket and said plasma tube, means connecting one end of said cooling jacket to said sealing ring, a second part formed as an electrode mount, means releasably connecting said second part and said first part, and an electrode mounted on said second part and extending within said one end of said plasma tube, whereby said second part and said electrode mounted thereon can be disconnected from said assembly for cleaning, repair or replacement of said electrode or for cleaning the inside of said plasma tube without disturbing the integrity of said coolant passage.

20. A gas laser tube assembly according to claim 19, wherein said electrode and said second part each include a bore extending therethrough in a direction essentially coaxial with the longitudinal axis of said plasma tube and communicating with the interior of said plasma tube.

21. A gas laser tube assembly according to claim 20, wherein said second part includes a tubular projection at its end opposite said plasma tube, said tubular projection surrounding and being essentially coaxial with the bore in said second part and said tubular projection being telescopingly positioned within a bore of an adjacent member.

22. A gas laser tube assembly according to claim 21, wherein means are provided for releasably sealing the tubular projection in a gas-tight manner in the bore of said adjacent member, and wherein the leading end of said tubular projection is inclined with respect to the optic axis of said gas laser tube assembly.

23. A gas laser tube assembly according to claim 21, wherein the bore in said adjacent member is a gas port for conveying gas to or from said plasma tube by way of the bore in said second part and the bore in said electrode.

24. A gas laser tube assembly according to claim 21, wherein the bore in said adjacent member extends completely through said member and wherein the end of said member opposite said one end of said plasma tube includes means for connecting a mirror or an additional gas laser plasma tube to said member.

25. A gas laser tube assembly according to claim 19, wherein said one end of said plasma tube is bell-shaped to accommodate said electrode.

26. A gas laser tube assembly according to claim 19, wherein the outer surface of said one end of said cooling jacket is conically shaped and said means for connecting said one end of said cooling jacket to said first part includes a conical cooling jacket sealing ring surrounding said conically shaped one end of said cooling jacket and threadedly attached to said first part, a compression ring positioned between said sealing ring and the outer surface of said conically shaped one end of said cooling jacket, and an O-ring seal positioned between said first part and an end surface of said one end of said cooling jacket.

27. A gas laser tube assembly according to claim 19, wherein said first part includes a passage for conveying fluid coolant to or from said coolant passage.

28. A gas laser tube assembly according to claim 19, wherein means are provided for releasably connecting said first part to said one end of said plasma tube, said means comprising a plasma tube sealing ring threadedly attached to said first part and an O-ring seal positioned between said sealing ring and said first part and engaging the outer surface of said one end of said plasma tube.

29. A gas laser tube assembly according to claim 19, wherein an O-ring seal is provided between said first and second parts.

30. A gas laser tube assembly according to claim 19, wherein said assembly further includes a third part in the form of a sealing ring connected to the other end of said plasma tube, means connecting the other end of said cooling jacket to said third part, a fourth part formed as an electrode mount, means for releasably connecting said fourth part to said third part, and an additional electrode mounted on said fourth part and extending within said other end of said plasma tube.

31. A gas laser tube assembly according to claim 30, wherein said electrode and said additional electrode are of equal mass so that said gas laser can be run on either alternating or direct current.

* * * * *